(12) United States Patent
Fuse et al.

(10) Patent No.: US 6,189,639 B1
(45) Date of Patent: Feb. 20, 2001

(54) CHAIN ROLLER STRUCTURE IN CHAIN DRIVEN VEHICLE

(75) Inventors: Tomohiro Fuse; Kazuhiko Gogo, both of Saitama (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/108,390

(22) Filed: Jul. 1, 1998

(30) Foreign Application Priority Data

Jul. 1, 1997 (JP) .................................................. 9-176216

(51) Int. Cl.[7] .................................................. B62D 61/02
(52) U.S. Cl. .......................... 180/231; 474/133; 474/135; 474/94
(58) Field of Search ............................ 180/231; 474/111, 474/112, 118, 133, 135, 136, 138, 94, 161, 47, 190, 191, 192, 199

(56) References Cited

U.S. PATENT DOCUMENTS

| 2,572,276 | * | 10/1951 | Moe | 474/191 |
| 2,839,116 | * | 6/1958 | Friedl | 474/94 |
| 3,083,584 | * | 4/1963 | Nanson | 474/191 |
| 3,188,775 | * | 6/1965 | Cosmos | 474/191 |
| 3,626,774 | * | 12/1971 | Schon | 474/191 |
| 5,244,439 | * | 9/1993 | Rogus | 474/136 |
| 5,797,819 | * | 8/1998 | Arai | 474/190 |

FOREIGN PATENT DOCUMENTS

| 762571 | * | 11/1956 | (GB) | 474/191 |
| 60-60388 | | 4/1985 | (JP) . | |
| 998787 | * | 2/1983 | (SU) | 474/138 |

* cited by examiner

*Primary Examiner*—Daniel G. DePumpo
(74) *Attorney, Agent, or Firm*—Birch, Stewart, Kolasch & Birch, LLP (57) ABSTRACT

A chain roller for supporting a chain when a rear wheel is lowered a given distance or more is mounted to a body frame. The chain roller is elastically deformable. The chain roller includes a hard rubber or hard resin roller having a plurality of axial holes like a lotus root. When a depression load of the chain acts on the roller, the roller is elastically deformed with the axial holes being depressed, thereby relaxing tension of the chain. In a modification, a shock absorber is provided between the body frame and a roller supporting member to relax the tension, or a roller supporting member having elasticity is mounted to the body frame to relax the tension. The absorptivity of displacement and shock can be easily improved with a simple structure.

18 Claims, 11 Drawing Sheets

CHAIN ROLLER STRUCTURE IN CHAIN DRIVEN VEHICLE

BACKGROUND OF THE INVENTION

1. Field of the Invention

The present invention relates to a chain roller structure in a chain driven vehicle such as a motorcycle.

2. Description of Background Art

A chain roller structure in a motorcycle is described in Japanese Utility Model Publication No. 60-60388 entitled "Slack Prevention Device for Drive Chain in Motorcycle", for example. According to FIG. 2 in this publication, the prior art chain roller structure includes a swing arm 16 pivotably supported at its one end to a body of the motorcycle, a roller 15 rotatably supported to the other end of the swing arm 16, a fixed arm 21 located below the swing arm 16 and welded to the body, and an adjusting bolt 23 mounted to the fixed arm 21 in perpendicular relationship to the swing arm 16 so that an upper portion of the adjusting bolt 23 abuts against the swing arm 16. The roller 15 functions to apply an upward force to a drive chain 1, thereby preventing slack of the drive chain 1.

The roller 15 is generally formed of a hard resin in consideration of wear resistance, resulting in poor shock absorptivity.

In a kind of motorcycle called an off-road motorcycle, there is a possibility of hopping (large vertical movement) upon deceleration during running on an unpaved rough road such as a mountain road. At this time, tension is cyclically applied to the chain 1 in a driving direction and a decelerating direction, and this chain tension becomes higher than that during normal running. The cycle of generation of such a high chain tension is about 15 times per second.

When the chain tension acts on a lower portion of the chain (in the decelerating direction) and the lower portion comes into contact with the roller 15 located below the chain, a force of contracting a rear suspension is generated. Such an impactive chain tension intermittently generated has an adverse effect on the rear suspension to possibly deteriorate ride comfort.

SUMMARY OF THE INVENTION

It is accordingly an object of the present invention to provide a chain roller structure having high absorptivity of displacement and shock with a simple structure and a low cost.

According to the present invention, there is provided in a chain driven vehicle having a body frame, a swing arm vertically pivotably mounted at its front end to said body frame, a rear wheel rotatably mounted to a rear end of said swing arm, an engine located before said swing arm, and a chain for transmitting a driving force of said engine to said rear wheel; a chain roller structure comprising a chain roller mounted to said body frame for supporting said chain when said rear wheel is lowered a given distance or more, said chain roller being elastically deformable.

The chain roller is elastically deformable. Accordingly, the absorptivity of displacement and shock can be easily improved, and the structure can be simplified to reduce the number of parts.

According to the present invention, said chain roller comprises a hard rubber or hard resin roller having a plurality of axial holes. By forming the plural axial holes in the hard rubber or hard resin solid roller, the deformability of the roller can be greatly improved. Further, a cost reduction can be expected because of the simple structure.

According to the present invention, said chain roller comprises a soft resin roller and a wear resistant member mounted on the outer circumference of said soft resin roller.

When the chain strikes against the chain roller, the soft resin roller is deformed to relax the chain tension. Further, the wear resistant member prevents wear of the chain roller. Thus, excess tension can be relaxed and durability can be improved.

According to the present invention, there is provided in a chain driven vehicle having a body frame, a swing arm vertically pivotably mounted at its front end to said body frame, a rear wheel rotatably mounted to a rear end of said swing arm, an engine located before said swing arm, and a chain for transmitting a driving force of said engine to said rear wheel; a chain roller structure comprising a roller supporting member vertically movably mounted to said body frame, a shock absorber connected between said body frame and said roller supporting member, and a chain roller mounted to said roller supporting member for supporting said chain when said rear wheel is lowered a given distance or more.

The roller supporting member is vertically movably mounted to the body frame. Accordingly, large displacement can be absorbed. Further, the shock absorber is provided on the roller supporting member. Accordingly, the absorptivity of shock can be improved. Further, the structure can be simplified to reduce the number of parts.

According to the present invention, there is provided in a chain driven vehicle having a body frame, a swing arm vertically pivotably mounted at its front end to said body frame, a rear wheel rotatably mounted to a rear end of said swing arm, an engine located before said swing arm, and a chain for transmitting a driving force of said engine to said rear wheel; a chain roller structure comprising a roller supporting member mounted to said body frame, said roller supporting member having elasticity, and a chain roller mounted to said roller supporting member for supporting said chain when said rear wheel is lowered a given distance or more.

The roller supporting member has elasticity. Accordingly, the absorptivity of displacement and shock can be improved. Further, the structure can be simplified to reduce the number of parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will now be described with reference to the attached drawings. Each drawing is to be viewed in the same orientation as that of the reference numerals shown therein.

Figure 1:
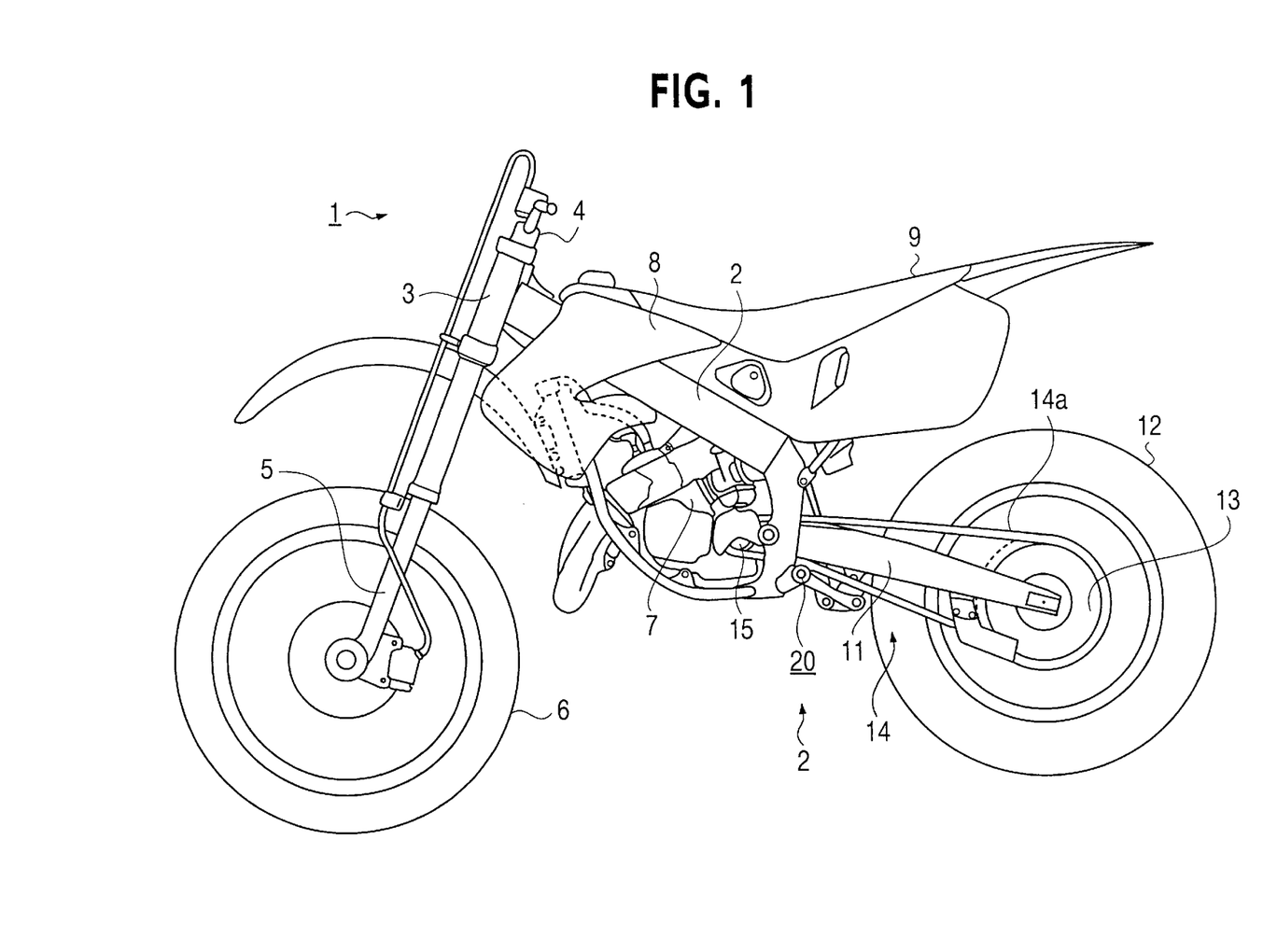
FIG. 1 is a side view of a motorcycle to which the present invention is applied.

FIG. 1 is a side view of a motorcycle 1 to which the present invention is applied. The motorcycle 1 includes a body frame 2, a head pipe 3 fixed to the front end of the body frame 2, a steering post 4 rotatably supported on the head pipe 3, a front fork 5 fixed to the lower end of the steering post 4, a front wheel 6 rotatably mounted on the lower ends of the front fork 5, an engine 7 mounted on a central lower portion of the body frame 2, a fuel tank 8 mounted on an upper portion of the body frame 2, a seat 9 extending rearward from the fuel tank 8, a swing arm 11 vertically swingably mounted at its front end on a rear lower portion of the body frame 2, a rear wheel 12 rotatably mounted on the rear end of the swing arm 11, a rear sprocket 13 mounted on the rear wheel 12, a drive sprocket 15 mounted on the engine 7, and a drive chain 14 wrapped between the drive sprocket 15 and the rear sprocket 13 to drive the rear sprocket 13.

Reference numeral 20 generally denotes a chain roller structure provided at a rear lower portion of the body frame 2.

Figure 2:
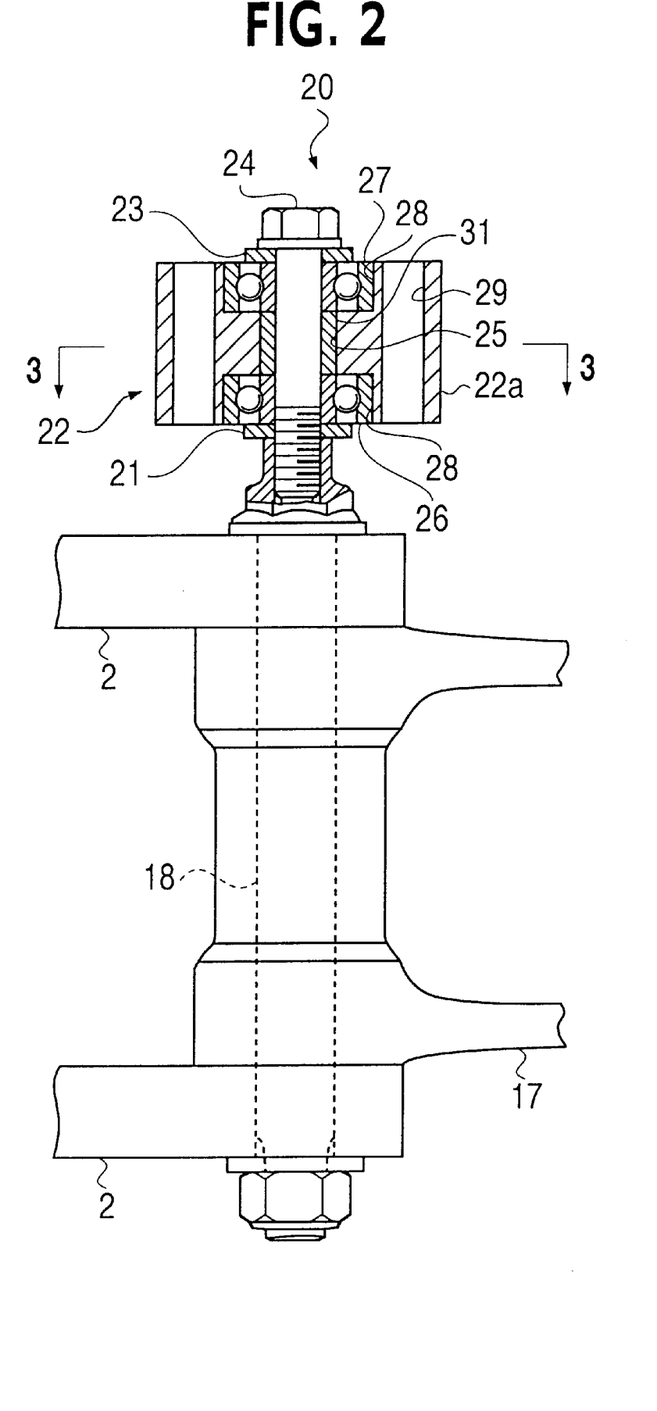
FIG. 2 is a view taken in the direction of the arrow 2 shown in FIG. 1, showing a horizontal cross section of the chain roller structure according to the present invention.

FIG. 2 is a view taken in the direction of the arrow 2 shown in FIG. 1, showing a horizontal cross section of the chain roller structure 20 shown in FIG. 1. The chain roller structure 20 includes a washer 21, a chain roller 22, a washer 23, and a mounting bolt 24. The chain roller 22 is mounted through the washers 21 and 23 and the mounting bolt 24 to an arm bolt 18 for mounting a link arm 17 to the body frame 2.

The chain roller 22 is a bearing roller consisting of a roller 22a formed of a hard resin, a pair of ball bearings 26 and 27 mounted in the roller 22a, a steel collar 31 mounted between the ball bearings 26 and 27. The roller 22a has a center hole 25, a pair of recesses 28 formed at the opposite ends of the center hole 25 for receiving the ball bearings 26 and 27, and a plurality of axial holes 29 formed around the center hole 25. Thus, the roller 22a is rotatably supported through the ball bearings 26 and 27 and the collar 31 to the mounting bolt 24.

Figure 3:
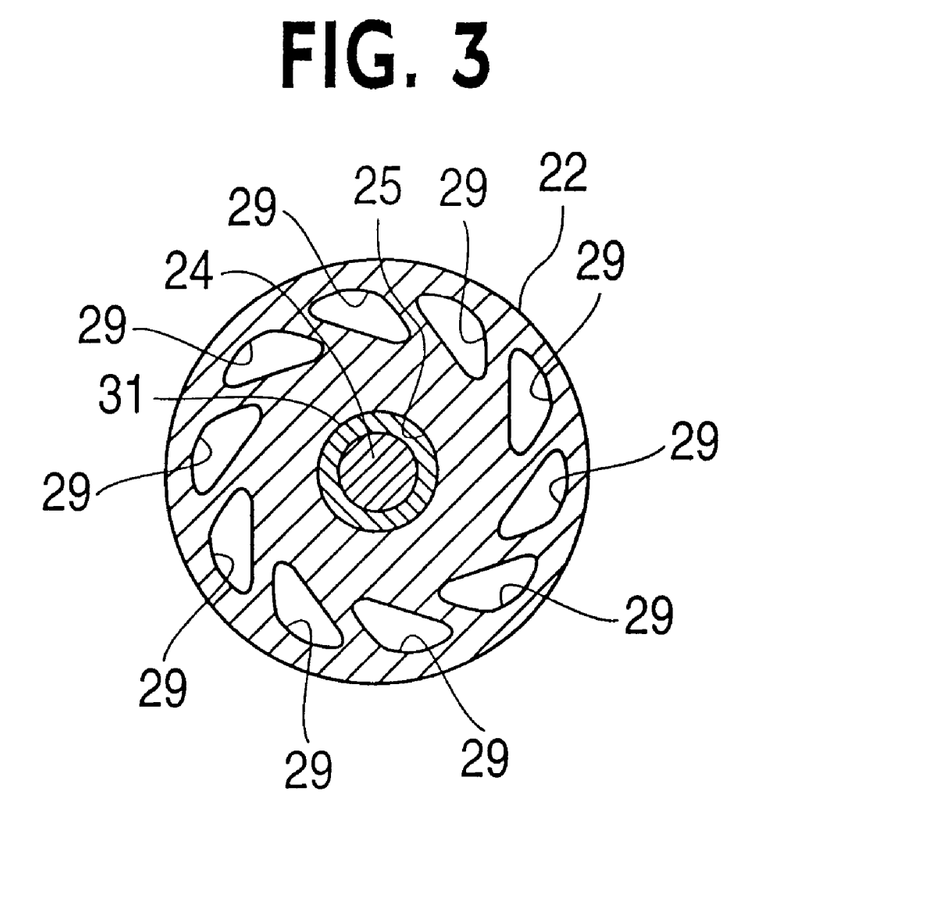
FIG. 3 is a cross section taken along the line 3—3 in FIG. 2.

FIG. 3 is a cross section taken along the line 3—3 in FIG. 2, showing the arrangement of the plural axial holes 29 (ten axial holes being shown). That is, the plural axial holes 29 are arranged at circumferentially equal intervals in parallel-axis relationship with the center hole 25. Each axial hole 29 is a through hole having a substantially triangular cross section.

Figure 4A:
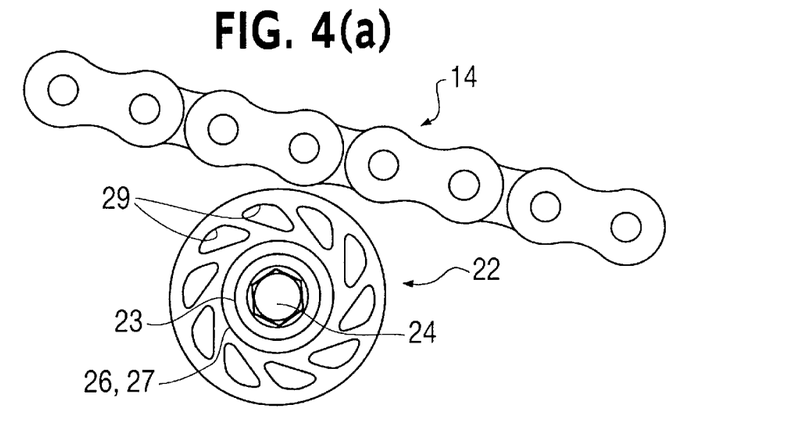
FIGS. 4a to 4c are elevational views of the chain roller according to the present invention.
Figure 4B:
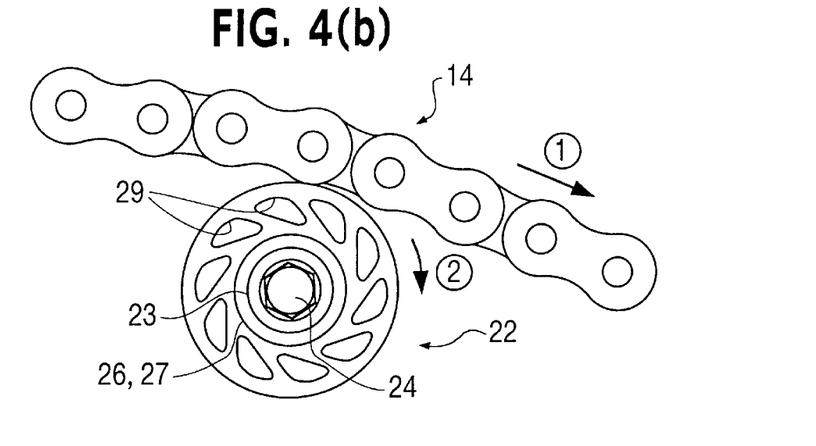
Figure 4C:
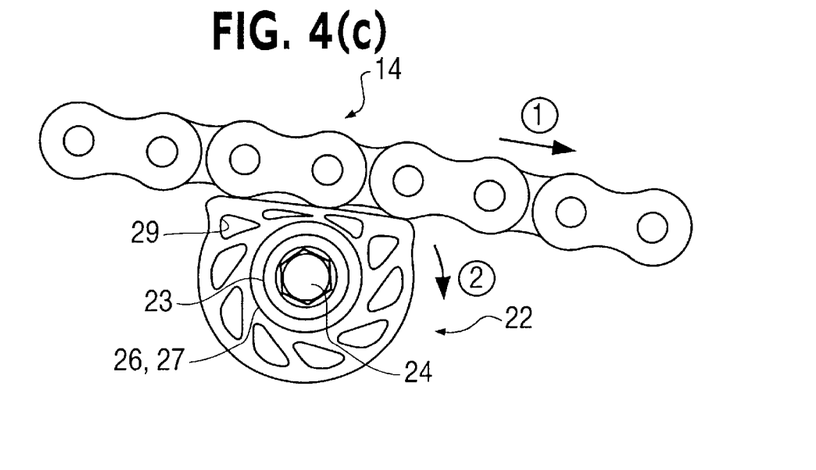

FIGS. 4a to 4c are elevational views of the chain roller 22 according to the present invention. The operation of the chain roller 22 for absorbing shock from the chain 14 will now be described with reference to FIGS. 4a to 4c.

FIG. 4a shows a condition where the chain 14 is separate from the chain roller 22 during normal running. In this condition, the tension of the chain 14 driven by the drive sprocket 15 (see FIG. 1) is applied to an upper portion 14a (see FIG. 1) of the chain 14 present above a line connecting the center of the rear sprocket 13 (see FIG. 1) and the center of the drive sprocket 15. Accordingly, the chain 14 has no adverse effect on the ride comfort.

FIG. 4b shows a condition where the chain 14 comes into slight contact with the chain roller 22 because of slight lowering of the rear wheel 12 (see FIG. 1). In this condition, the chain roller 22 is rotated in the direction of the arrow ② because the chain 14 is always moved in the direction of the arrow ① during running. At the same time, the chain roller 22 is slightly deformed by the chain 14. Accordingly, the chain 14 is guided by such slight deformation and rotation of the chain roller 22 to thereby maintain proper tension of the chain 14.

FIG. 4c shows a condition where the chain 14 comes into strong abutment against the chain roller 22 because of further lowering of the rear wheel 12. At this movement, the chain roller 22 is largely deformed by the chain 14 to thereby absorb shock from the chain 14 and prevent an excess increase in the tension of the chain 14.

That is, the rear wheel 12 of the motorcycle 1 shown in FIG. 1 largely moves in the vertical direction during running on a rough road. At the moment the rear wheel 12 lowers to cause lowering of the chain 14 from the condition shown in FIG. 4a to the condition shown in FIG. 4b, an outer surface portion of the chain roller 22 is deformed by the chain 14. When the rear wheel 12 further lowers to cause further lowering of the chain 14 to the condition shown in FIG. 4c, the roller 22a (see FIG. 2) of the chain roller 22 is deformed by the chain 14 because of the presence of the axial holes 29. Since the chain 14 is always moved in the direction of the arrow ① during running, the chain roller 22 is rotated in the direction of the arrow ② and prevents an excess increase in the tension of the chain 14.

Figure 5:
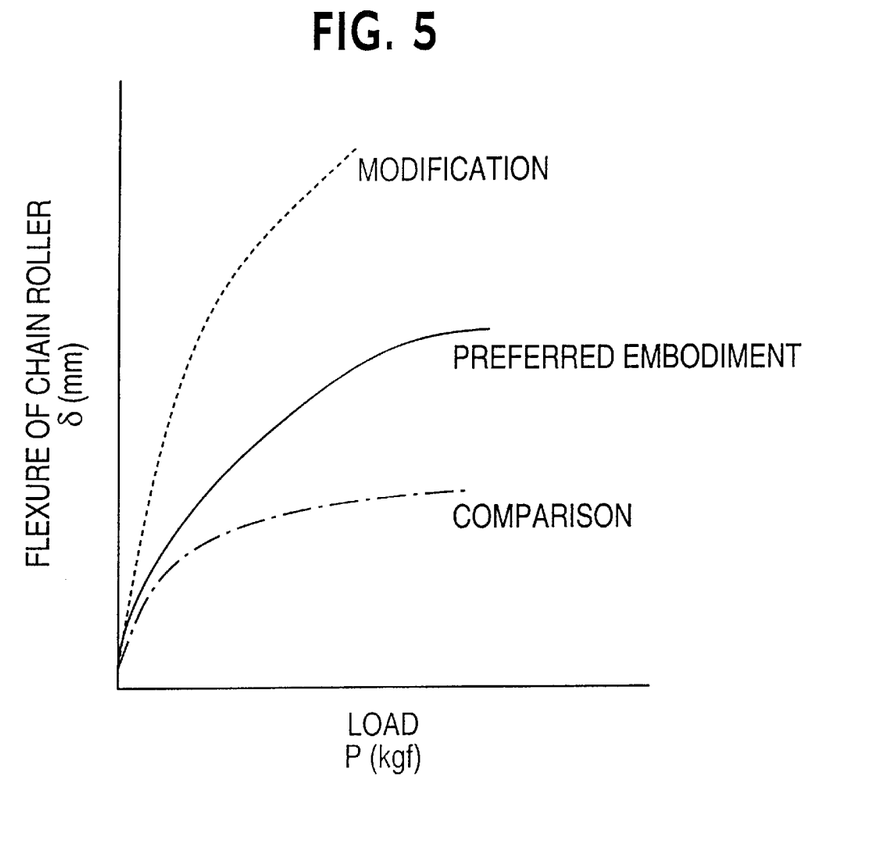
FIG. 5 is a graph showing the relation between load and flexure of a chain roller.

FIG. 5 is a graph showing the relation between load and flexure of a chain roller. In FIG. 5, the horizontal axis represents load P and the vertical axis represents flexure δ of a chain roller. In this graph, the flexure δ means the amount of depression of a chain roller.

The long and short dashed line shows a comparison employing a solid roller formed of a hard resin as the chain roller.

The solid line shows the above preferred embodiment of the present invention employing the roller formed of a hard resin and having the plural axial holes 29 like a lotus root arranged circumferentially around the center hole 25.

The broken line shows a modification of the present invention employing a roller formed of foamed urethane and surrounded by a ring formed of a hard resin, which substantially corresponds to any one of the configurations shown in FIGS. 6c, 6d and 6e to be hereinafter described.

The comparison is inferior in deformability to the others because the flexure increases less with an increase in load.

The preferred embodiment has a sufficient deformability because the flexure increases substantially in proportion with an increase in load.

The modification has an excellent deformability because the flexure remarkably increases with an increase in load.

FIGS. 6a to 6f show other various preferred embodiments of the chain roller according to the present invention. In these figures, the same reference numerals as those shown in FIGS. 2 and 3 denote similar elements, and the description thereof will be omitted herein.

Figure 6A:
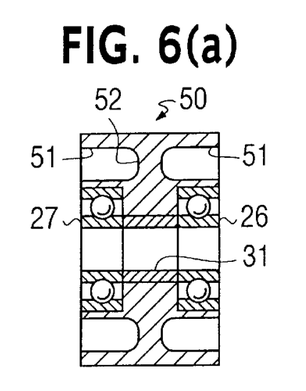
FIGS. 6a to 6f are views showing other various preferred embodiments of the chain roller according to the present invention.

FIG. 6a is a sectional view of a chain roller 50; 1, having a plurality of axial holes 51 each having a bottom.

The bottoms of any aligned ones of the plural axial holes 51 are opposed to form a rib 52 for receiving a load. By changing the thickness of each rib 52, the flexure can be adjusted.

Figure 6B:
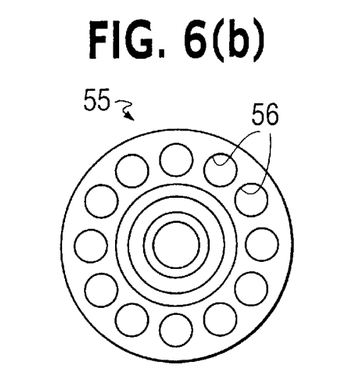

FIG. 6b is an elevational view of a chain roller 55 having the same configuration as that of the chain roller 22 with the exception that the triangular axial holes 29 of the chain roller 22 are replaced by a plurality of circular axial holes 56. This preferred embodiment has an advantage such that the chain roller 55 can be easily formed and a mold cost therefor can be reduced owing to the simple shape of each axial hole 56.

Figure 6C:
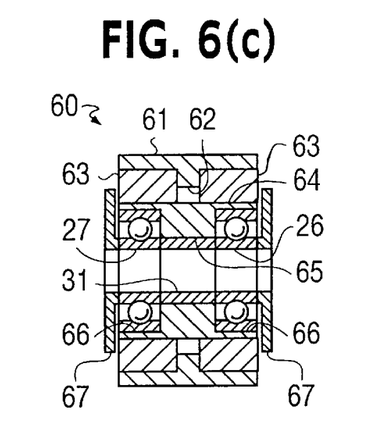

FIG. 6c is a sectional view of a chain roller 60 having a three-layer roller structure consisting of a hollow cylindrical outer roller 61 having a circular projection 62, a pair of hollow cylindrical intermediate rollers 63 inserted in the outer roller 61 on the opposite sides of the circular projection 62, and an inner roller 64 inserted in the intermediate rollers 63. The inner roller 64 has a center hole 65 and a pair of recesses 66 formed at the opposite ends of the center hole 65. A pair of ball bearings 26 and 27 are received in the recesses 66, and a collar 31 is inserted in the center hole 65 between the ball bearings 26 and 27. A pair of washers 67 each having a relatively large diameter are mounted so as to hold the ball bearings 26 and 27, the collar 31, and the three-layer roller structure. Because the intermediate rollers 63 are held by the washers 67, the outer roller 61 is prevented from axially slipping by the circular projection 62.

The three kinds of rollers 61, 63 and 64 may be formed of different materials. For example, the outer roller 61 can be formed of a hard resin (wear resistant material) having high wear resistance to improve the durability and extend the life; the intermediate rollers 63 can be formed of a soft resin having high energy absorptivity to absorb shock; and the inner roller 64 can be formed of a hard resin capable of resisting load to retain the shape.

Figure 6D:
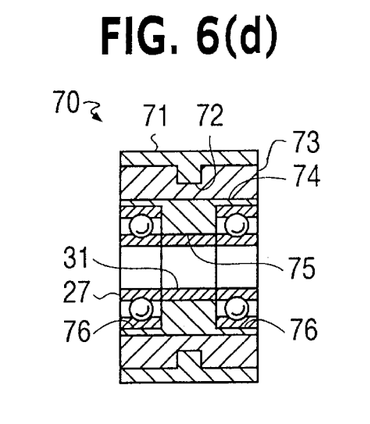

FIG. 6d is a sectional view of a chain roller 70 having a three-layer roller structure consisting of a hollow cylindrical outer roller 71 having a circular projection 72 for preventing axial slip, a hollow cylindrical intermediate roller 73 mounted within the outer roller 71, and an inner roller 74 inserted in the intermediate roller 73. The inner roller 74 has a center hole 75 and a pair of recesses 76 formed at the opposite ends of the center hole 75. The outer roller 71 is formed of a hard resin (wear resistant material) having high wear resistance; the intermediate roller 73 is formed of a soft resin having high energy absorptivity; and the inner roller 74 is formed of a hard resin.

By using adhesive to fix the three rollers 71, 73, and 74, the two intermediate rollers 63 of the chain roller 60 shown in FIG. 6c can be replaced by the single intermediate roller 73, thereby reducing the number of parts. Furthermore, washers (not shown) can be reduced in size to thereby reduce the weight and working cost.

Figure 6E:
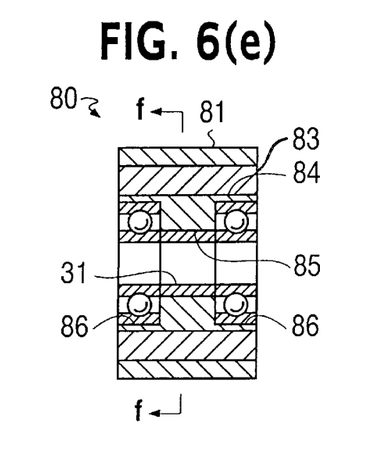

FIG. 6e is a sectional view of a chain roller 80 having a three-layer roller structure similar to that shown in FIG. 6d with the exception that the circular projection 72 is not provided. That is, the three-layer roller structure of the chain roller 80 consists of an outer roller 81, an intermediate roller 83 inserted in the outer roller 81, and an inner roller 84 inserted in the intermediate roller 83. The inner roller 84 has a center hole 85 and a pair of recesses 86 formed at the opposite ends of the center hole 85. The outer roller 81 is formed of a hard resin (wear resistant material) having high wear resistance; the intermediate roller 83 is formed of a soft resin having high energy absorptivity; and the inner roller 84 is formed of a hard resin.

The outer roller 81 is simple in shape because the circular projection 72 is not formed therein. Further, the wall thickness of the intermediate roller 83 can be increased to thereby increase the flexure and accordingly further relax the chain tension.

Figure 6F:
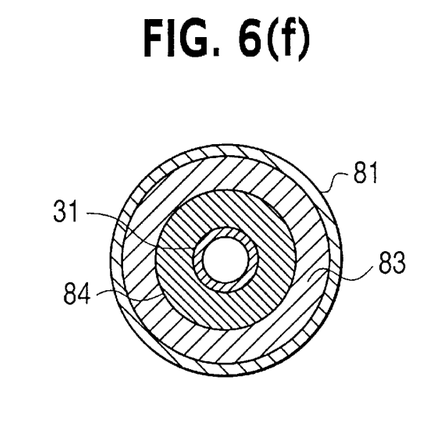

FIG. 6f is a cross section taken along the line f—f in FIG. 6e. The inner surface of the inner roller 84 contacting with the collar 31 is a sliding surface. By using adhesive to bond the inner surface of the outer roller 81 and the outer surface of the intermediate roller 83 and to bond the inner surface of the intermediate roller 83 and the outer surface of the inner roller 84, the three rollers 81, 83, and 84 can be integrated together to thereby prevent slipping and receive chain load as a unit.

FIGS. 7a to 7d show further preferred embodiments of the chain roller according to the present invention. In these figures, the same reference numerals as those shown in FIGS. 2 and 3 denote similar elements, and the description thereof will be omitted herein.

Figure 7A:
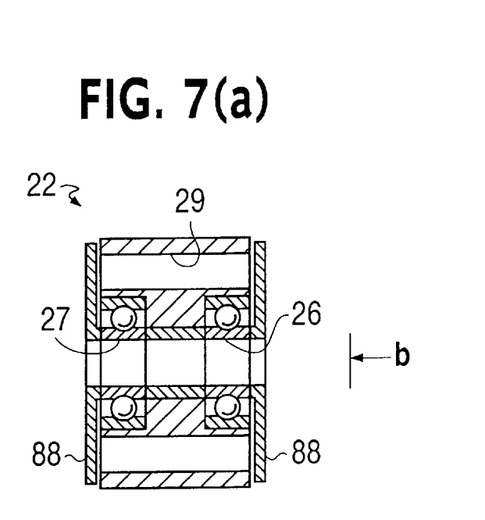
FIGS. 7a to 7d are views showing further preferred embodiments of the chain roller according to the present invention.

FIG. 7a is a sectional view of a chain roller 22 having a pair of washers 88 each having a diameter large enough to cover a plurality of (e.g., ten) axial holes 29, thereby preventing entry of earth and send into the axial holes 29 during running. Accordingly, flexure can be maintained.

Figure 7B:
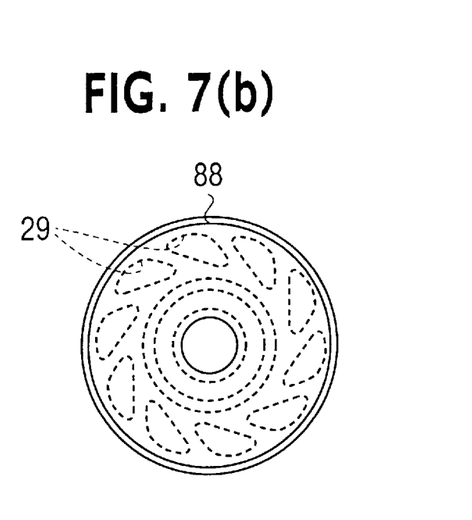

FIG. 7b is a view taken in the direction of the arrow b shown in FIG. 7a, showing that all the axial holes 29 are covered with the washers 88.

Figure 7C:
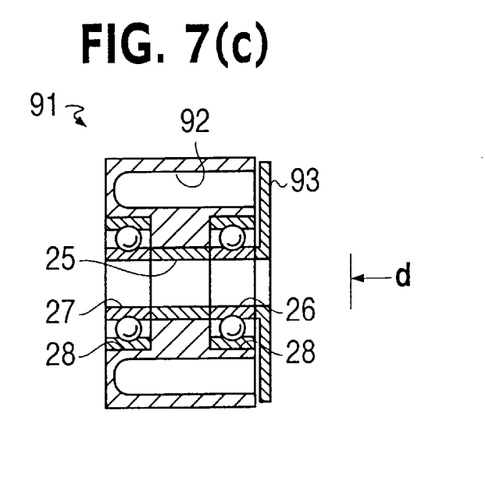

FIG. 7c is a sectional view of a chain roller 91 having a washer 93 having a diameter large enough to cover a plurality of (e.g., ten) axial holes 92. Each axial hole 92 is open at one end of the chain roller 91 and closed at the other end. With this configuration, the entry of earth and sand into the axial holes 92 can be prevented by the single washer 93, thereby reducing the weight and the number of parts.

Figure 7D:
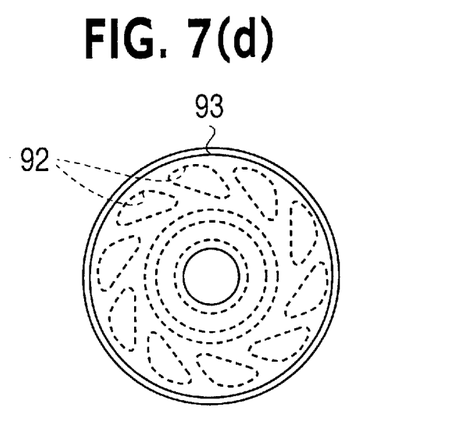

FIG. 7d is a view taken in the direction of the arrow d shown in FIG. 7c, showing that all of the axial holes 92 are covered with the washer 93.

FIGS. 8a to 8d show still further preferred embodiments of the chain roller according to the present invention. In these figures, the same reference numerals as those shown in FIGS. 2 and 3 denote similar elements, and the description thereof will be omitted herein.

Figure 8A:
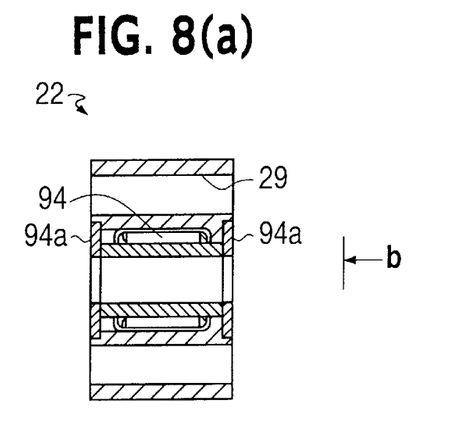
FIGS. 8a to 8d are views showing still further preferred embodiments of the chain roller according to the present invention.
Figure 8B:
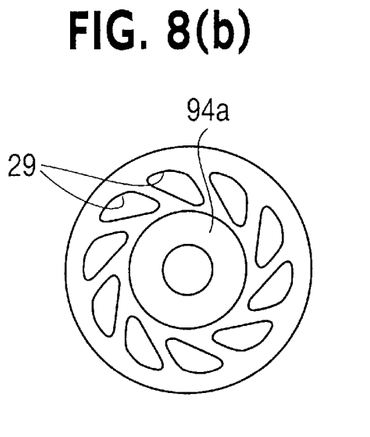

FIG. 8a is a sectional view of a chain roller 22 having a needle bearing 94, and FIG. 8b is a view taken in the direction of the arrow b shown in FIG. 8a. The needle bearing 94 is used in place of the ball bearings 26 and 27 shown in FIG. 2 to thereby allow the use of smaller diameter washers 94a and enlarge the area of each end surface of the chain roller for opening the axial holes 29. As a result, the flexure can be more increased, and the energy absorption and tension relaxation can be improved.

Figure 8C:
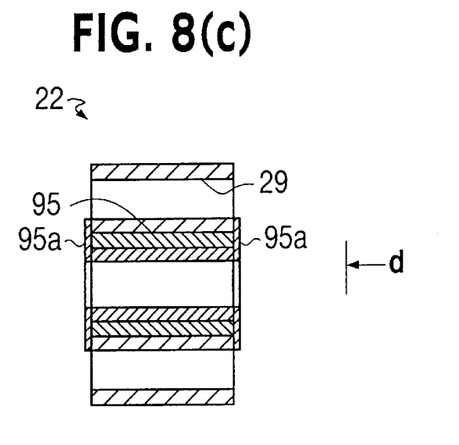
Figure 8D:
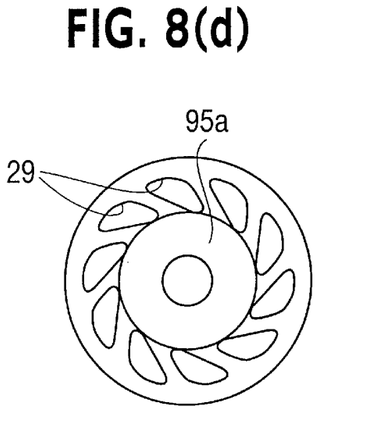

FIG. 8c is a sectional view of a chain roller 22 having an oil-impregnated collar 95, and FIG. 8d is a view taken in the direction of the arrow d shown in FIG. 8c. The oil-impregnated collar 95 is used in place of the ball bearings 26 and 27 shown in FIG. 2 to thereby allow the use of smaller-diameter washers 95a and enlarge the area of each end surface of the chain roller for opening the axial holes 29. As a result, the flexure can be increased, and the structure can be simplified to thereby reduce the working cost.

Some preferred embodiments according to the present invention will be described with reference to FIGS. 9 to 12, and a preferred embodiment according to the present invention will be described with reference to FIG. 13.

Figure 9:
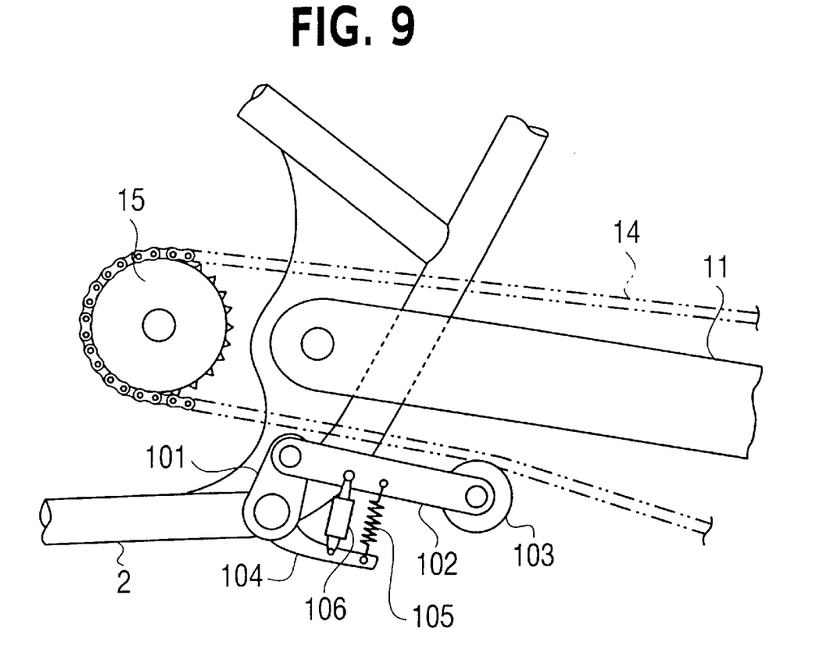
FIG. 9 is a side view showing a first modification of the chain roller structure according to the present invention.

FIG. 9 shows a first modification of the chain roller structure according to the present invention. This chain roller structure includes a piece 101 fixed at its lower end to the body frame 2, a roller supporting member 102 like a swing arm vertically pivotably mounted at its front end to the upper end. of the piece 101, a chain roller 103 rotatably mounted. to the rear end of the roller supporting member 102, a fixed arm 104 extending from the body frame 2 in substantially parallel relationship to the roller supporting member 102, and a compression spring 105 and a shock absorber 106 both connected between the fixed arm 104 and the roller supporting member 102. The compression spring 105 may be replaced by an elastic member such as a rubber member.

The shock absorber 106 is a cylinder type shock absorber, for example. The chain roller 103 may be selected from a hard solid roller and a hollow roller with axial holes as mentioned above.

When the swing arm 11 is lowered a given distance or more, the chain 14 is also lowered to strike against the chain roller 103. At this time, a downward force and an impact force acting on the chain roller 103 are absorbed by compression of the compression spring 105 and vibration damping by the shock absorber 106. That is, the roller supporting member 102 is rotated clockwise as viewed in FIG. 9 to thereby allow large downward displacement of the chain roller 103 and absorb the shock by means of the compression spring 105 and the shock absorber 106.

The compression spring 105 may be incorporated into the shock absorber 106 to thereby construct an integrated shock absorber. Alternatively, the shock absorber 106 may be omitted to use the compression spring 105 only as a shock absorber.

Figure 10:
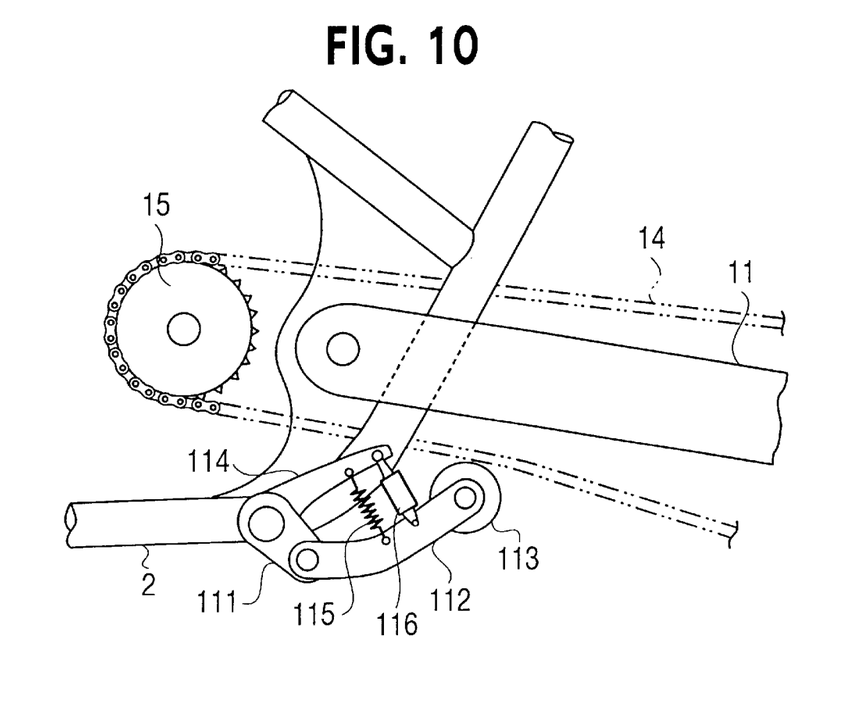
FIG. 10 is a side view showing a second modification of the chain roller structure according to the present invention.

FIG. 10 shows a second modification of the chain roller structure according to the present invention. This chain roller structure includes a piece 111 fixed at its upper end to the body frame 2, a roller supporting member 112 like a swing arm vertically pivotably mounted at its front end to the lower end of the piece 111, a chain roller 113 rotatably mounted to the rear end of the roller supporting member 112, a fixed arm 114 extending from the body frame 2 in substantially parallel relationship to the roller supporting member 112, and an extension spring 115 and a shock absorber 116 both connected between the fixed arm 114 and the roller supporting member 112. The extension spring 115 may be replaced by an elastic member such as a rubber member.

The shock absorber 116 is a cylinder type shock absorber, for example. The chain roller 113 may be selected from a hard solid roller and a hollow roller with axial holes as mentioned above.

When the swing arm 11 is lowered a given distance or more, the chain 14 is also lowered to strike against the chain roller 113. At this time, a downward force and an impact force acting on the chain roller 113 are absorbed by extension of the extension spring 115 and vibration damping by the shock absorber 116. That is, the roller supporting member 112 is rotated clockwise as viewed in FIG. 10 to thereby allow large downward displacement of the chain roller 113 and absorb the shock by means of the extension spring 115 and the shock absorber 116.

The extension spring 115 may be incorporated into the shock absorber 116 to thereby construct an integrated shock absorber. Alternatively, the shock absorber 116 may be omitted to use the extension spring 115 only as a shock absorber.

Figure 11:
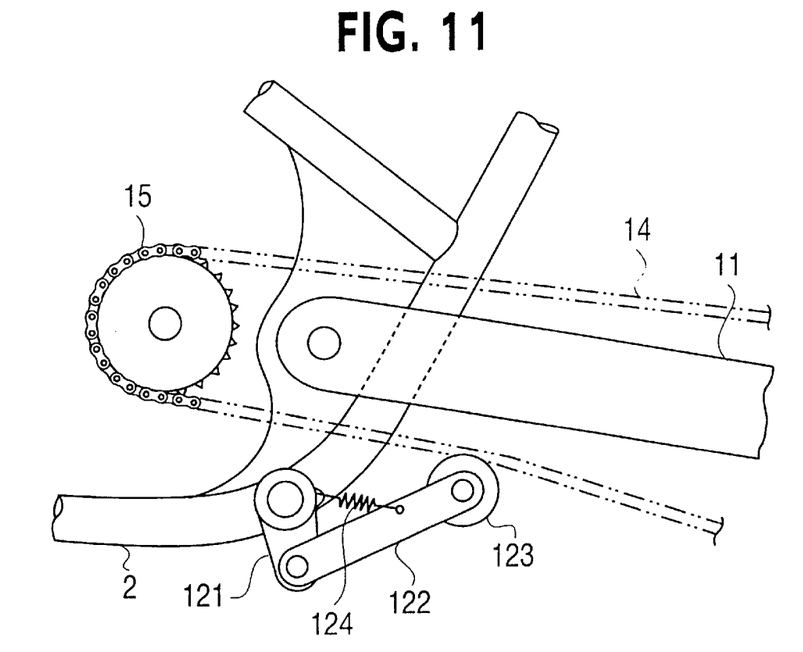
FIG. 11 is a side view showing a third modification of the chain roller structure according to the present invention.

FIG. 11 shows a third modification of the chain roller structure according to the present invention. This chain roller structure includes a piece 121 fixed at its upper end to the body frame 2, a roller supporting member 122 like a swing arm vertically pivotally mounted at its front end to the lower end of the piece 121, a chain roller 123 rotatably mounted to the rear end of the roller supporting member 122, and an extension spring 124 as a shock absorber connected between the body frame 2 and the roller supporting member 122. The extension spring 124 may be an elastic member such as a rubber member.

The chain roller 123 may be selected from a hard solid member and a hollow roller with axial holes as mentioned above.

When the swing arm 11 is lowered a given distance or more, the chain 14 is also lowered to strike against the chain roller 123. At this time, a downward force and an impact force acting on the chain roller 123 are absorbed by extension of the extension spring 124. That is, the roller supporting member 122 is rotated clockwise as viewed in FIG. 11 to thereby allow large downward displacement of the chain roller 123 and absorb the shock by means of the extension spring 124.

The extension spring 124 may be integrated with a shock absorber, and the assembly may be located at the position of the extension spring 124.

Figure 12:
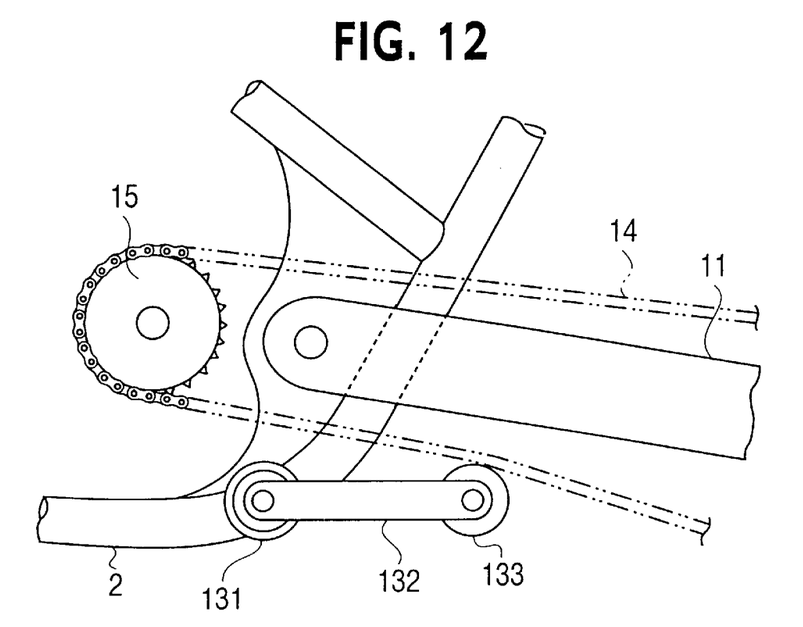
FIG. 12 is a side view showing a fourth modification of the chain roller structure according to the present invention.

FIG. 12 shows a fourth modification of the chain roller structure according to the present invention. This chain roller structure includes a rotary shock absorber 131 mounted to the body frame 2, a roller supporting member 132 like a swing arm vertically pivotably mounted at its front end to the rotary shock absorber 131, and a chain roller 133 rotatably mounted to the rear end of the roller supporting member 132.

Examples of the rotary shock absorber 131 include a commercially available rotary damper, rubber member, and torsion spring; however, it is preferable to incorporate a torsion spring in the rotary shock absorber 131 for restoration.

The chain roller 133 may be selected from a hard solid roller and a hollow roller with axial holes as mentioned above.

When the spring arm 11 is lowered a given distance or more, the chain 14 is also lowered to strike against the chain roller 133. At this time, a downward force and an impact force acting on the chain roller 133 are absorbed by the rotary shock absorber 131.

Figure 13:
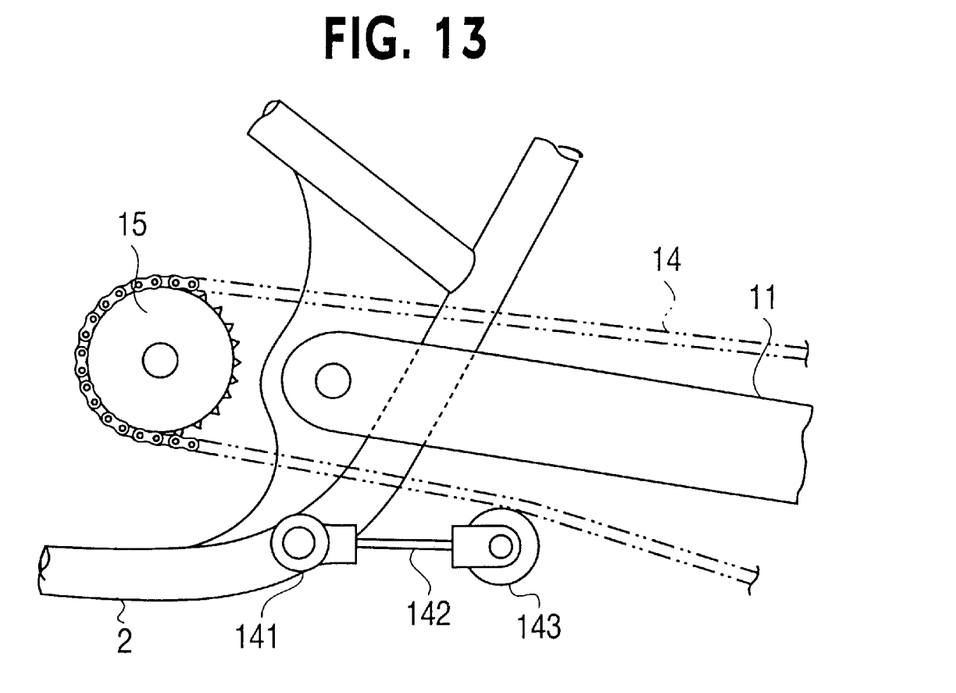
FIG. 13 is a side view showing a fifth modification of the chain roller structure according to the present invention.

FIG. 13 shows a fifth modification of the chain roller structure according to the present invention. This chain roller structure includes a block 141 fixedly mounted to the body frame 2, a roller supporting member 142 formed from an elastic member (e.g., leaf spring) vertically movably mounted at its front end to the block 141, and a chain roller 143 rotatably mounted to the rear end of the roller supporting member 142.

While the block 141 is a simple mounting member in this modification, it may be replaced by a rotary shock absorber (e.g., the element 131 shown in FIG. 12).

The chain roller 143 may be selected from a hard solid roller and a hollow roller with axial holes as mentioned above.

When the swing arm 11 is lowered a given distance or more, the chain 14 is also lowered to strike against the chain roller 143. At this time, a downward force and an impact force acting on the chain roller 143 are absorbed by flexure of the roller supporting member 142.

The axial holes 29 shown in FIG. 3 may serve also as a guide for checking the amount of wear of the chain roller 22. That is, when the outer circumferential surface of the chain roller 22 is worn by the chain 14 to reach any one of the axial holes 29, it shows the time for replacement of the chain roller 22. Similarly, the outer rollers 61, 71, and. 81 shown in FIGS. 6c, 6d, and 6e may serve also as a guide for such replacement time.

With the above configurations of the present invention, the following effects can be exhibited.

According to the present invention, there is provided in a chain driven vehicle having a body frame, a swing arm vertically pivotally mounted at its front end to said body frame, a rear wheel rotatably mounted to a rear end of said swing arm, an engine located before said swing arm, and a chain for transmitting a driving force of said engine to said rear wheel; a chain roller structure comprising a chain roller mounted to said body frame for supporting said chain when said rear wheel is lowered a given distance or more, said chain roller being elastically deformable.

The chain roller is elastically deformable. Accordingly, the absorptivity of displacement and shock can be easily improved, and the structure can be simplified to reduce the number of parts.

According to the present invention, said chain roller comprises a hard rubber or hard resin roller having a plurality of axial holes.

By forming the plural axial holes in a hard rubber or hard resin solid roller, the deformability of the roller can be greatly improved. Further, a cost reduction can be expected because of the simple structure.

According to the present invention, said chain roller comprises a soft resin roller and a wear resistant member mounted on the outer circumference of said soft resin roller.

When the chain strikes against the chain roller, the soft resin roller is deformed to relax the chain tension. Further, the wear resistant member prevents wear of the chain roller. Thus, excess tension can be relaxed and durability can be improved.

According to the present invention, there is provided in a chain driven vehicle having a body frame, a swing arm vertically pivotably mounted at its front end to said body frame, a rear wheel rotatably mounted to a rear end of said swing arm, an engine located before said swing arm, and a chain for transmitting a driving force of said engine to said rear wheel; a chain roller structure comprising a roller supporting member vertically movably mounted to said body frame, a shock absorber connected between said body frame and said roller supporting member, and a chain roller mounted to said roller supporting member for supporting said chain when said rear wheel is lowered a given distance or more.

The roller supporting member is vertically movably mounted to the body frame. Accordingly, large displacement can be absorbed. Further, the shock absorber is provided on the roller supporting member. Accordingly, the absorptivity of shock can be improved. Further, the structure can be simplified to reduce the number of parts.

According to the present invention, there is provided in a chain driven vehicle having a body frame, a swing arm vertically pivotably mounted at its front end to said body frame, a rear wheel rotatably mounted to a rear end of said swing arm, an engine located before said swing arm, and a chain for transmitting a driving force of said engine to said rear wheel; a chain roller structure comprising a roller supporting member mounted to said body frame, said roller supporting member having elasticity, and a chain roller mounted to said roller supporting member for supporting said chain when said rear wheel is lowered a given distance or more.

The roller supporting member has elasticity. Accordingly, the absorptivity of displacement and shock can be improved. Further, the structure can be simplified to reduce the number of parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In a chain driven vehicle having a body frame, a swing arm vertically pivotably mounted at a front end to said body frame, a rear wheel rotatably mounted to a rear end of said swing arm, an engine located forward of said swing arm on said body frame, and a chain for transmitting a driving force of said engine to said rear wheel, a chain roller structure wherein the improvement comprises a chain roller mounted to said body frame for supporting said chain when said rear wheel is lowered a predetermined distance, said chain roller being elastically deformable upon contact with said chain and having a plurality of axial holes extending therethrough, said axial holes being of substantially triangular cross section.

2. The chain roller structure according to claim 1, wherein said chain roller further comprises a hard rubber or hard resin roller.

3. The chain roller structure according to claim 1, wherein said chain roller comprises a soft resin roller and a wear resistant member mounted on the outer circumference of said soft resin roller.

4. The chain roller structure according to claim 1, wherein said chain roller includes a center hole for rotatably mounting said chain roller to said body frame and said plurality of axial holes are equally spaced holes extending through said chain roller, said holes each being formed along axes parallel to the axis of the center hole.

5. The chain roller structure according to claim 4, wherein each of said holes are radially spaced the same distance from said center hole, said holes forming a circumferential line of holes on said chain roller.

6. The chain roller structure according to claim 4, wherein said chain roller includes a collar within said center hole, and a plurality of recesses formed adjacent to said center hole, a ball bearing being located within each of said plurality of recesses.

7. In a chain driven vehicle having a body frame, a swing arm vertically pivotably mounted at a front end to said body frame, a rear wheel rotatably mounted to a rear end of said swing arm, an engine located forward of said swing arm on said body frame, and a chain for transmitting a driving force of said engine to said rear wheel, a chain roller structure wherein the improvement comprises:

a roller supporting member vertically movably mounted to said body frame;

a shock absorber connected between said body frame and said roller supporting member; and a chain roller mounted to said roller supporting member for supporting said chain when said rear wheel is lowered a predetermined distance, said chain roller being elastically deformable upon contact with said chain and having a plurality of axial holes extending therethrough, said axial holes being of substantially triangular cross section.

8. The chain roller structure according to claim 7, wherein said chain roller comprises a hard rubber or hard resin roller.

9. The chain roller structure according to claim 7, wherein said chain roller comprises a soft resin roller and a wear resistant member mounted on the outer circumference of said soft resin roller.

10. The chain roller structure according to claim 7, wherein said chain roller includes a center hole for rotatably mounting said chain roller to said body frame and said plurality of axial holes are equally spaced holes extending through said chain roller, said holes each being formed along axes parallel to the axis of the center hole.

11. The chain roller structure according to claim 10, wherein each of said holes are radially spaced the same distance from said center hole, said holes forming a circumferential line of holes on said chain roller.

12. The chain roller structure according to claim 10, wherein said chain roller includes a collar within said center hole, and a plurality of recesses formed adjacent to said center hole, a ball bearing being located within each of said plurality of recesses.

13. In a chain driven vehicle having a body frame, a swing arm vertically pivotably mounted at a front end to said body frame, a rear wheel rotatably mounted to a rear end of said swing arm, an engine located forward of said swing arm on said body frame, and a chain for transmitting a driving force of said engine to said rear wheel, a chain roller structure wherein the improvement comprises:

a roller supporting member mounted to said body frame, said roller supporting member being elastically supported; and a chain roller mounted to said roller supporting member for supporting said chain when said rear wheel is lowered a predetermined distance, said chain roller being elastically deformable upon contact with said chain and having a plurality of axial holes extending therethrough, said axial holes being of substantially triangular cross section.

14. The chain roller structure according to claim 13, wherein said chain roller comprises a hard rubber or hard resin roller.

15. The chain roller structure according to claim 13, wherein said chain roller comprises a soft resin roller and a wear resistant member mounted on the outer circumference of said soft resin roller.

16. The chain roller structure according to claim 13, wherein said chain roller includes a center hole for rotatably mounting said chain roller to said body frame and said plurality of axial holes are equally spaced holes extending through said chain roller, said holes each being formed along axes parallel to the axis of the center hole.

17. The chain roller structure according to claim 16, wherein each of said holes are radially spaced the same distance from said center hole, said holes forming a circumferential line of holes on said chain roller.

18. The chain roller structure according to claim 16, wherein said chain roller includes a collar within said center hole, and a plurality of recesses formed adjacent to said center hole, a ball bearing being located within each of said plurality of recesses.

* * * * *